C. BOULAY.
Galvanic Battery.
No. 70,791.
2 Sheets—Sheet 1.
Patented Nov. 12, 1867.
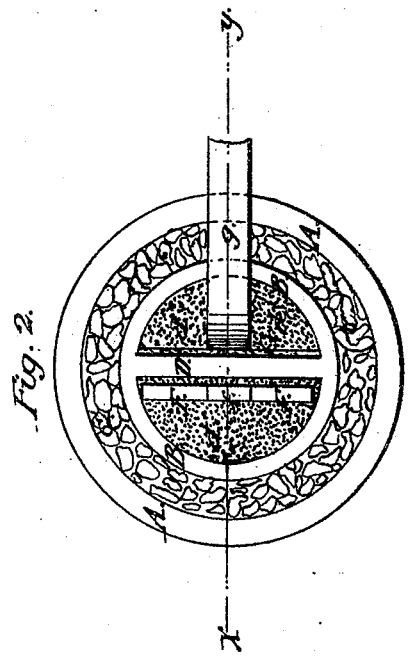
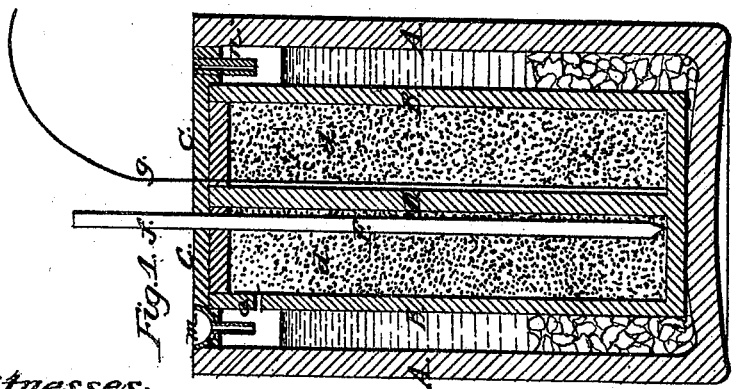
Witnesses:
Inventor:

C. BOULAY.
Galvanic Battery.
No. 70,791.
2 Sheets—Sheet 2.
Patented Nov. 12, 1867.
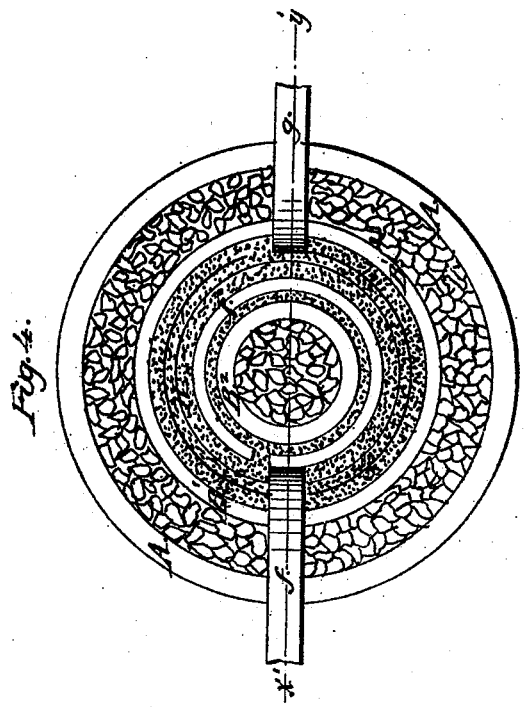
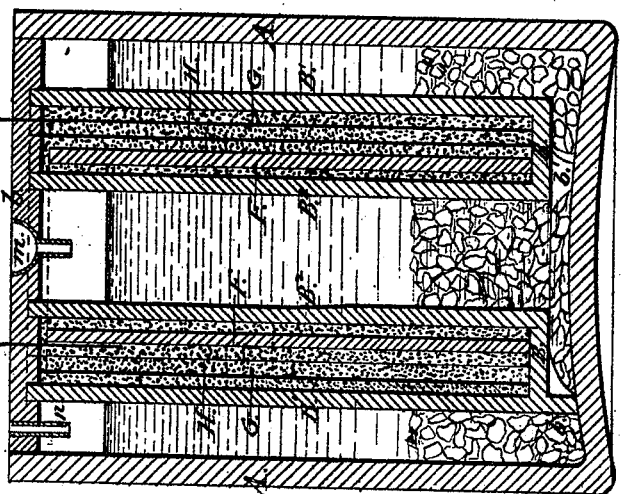
Witnesses:
Inventor:
Boulay

United States Patent Office.

CHARLES BOULAY, OF PARIS, FRANCE, ASSIGNOR TO JEAN DAVID SCHNEITER, OF THE SAME PLACE.

Letters Patent No. 70,791, dated November 12, 1867; patented in France, May 25, 1867.

IMPROVEMENT IN GALVANIC BATTERIES.

The Schedule referred to in these Letters Patent and making part of the same.

TO ALL WHOM IT MAY CONCERN:

Be it known that I, CHARLES BOULAY, of Paris, in the Empire of France, have invented certain Improvements in Galvanic Batteries; and I do hereby declare that the following is a full and exact description thereof, reference being had to the accompanying drawings, and to the letters of reference marked thereon.

The invention relates to improved arrangements of galvanic batteries, with the object of imparting to them a great constancy of action during a much longer period, as is the case with Daniel's or other hitherto-known electric batteries; besides, my improved batteries may be run for several months without requiring cleansing, or the addition of anything, except, perhaps, a small quantity of water; and no crystallization on the electrodes or connecting tongues, or the evolution of any noxious gas, takes place in them, which advantages consequently render them extremely useful for electric telegraphs, the ringing of bells or alarums, or other similar purposes.

The principle on which my improved arrangements of galvanic batteries are based consists in putting the electro-motive metals or bodies—such, for instance, as zinc, copper, carbon, or others—in contact with any suitable dry or slightly moistened, and more or less coarsely divided, pulverized, or crystallized exciting matters or mixture of the same, and which receive by little and little, and through any suitable porous partition, plate, diaphragm, or separating-vessel, and from any suitable exciting liquid or solution, the moisture required for putting and keeping them in the working condition.

According to this principle, various arrangements may be given to my improved batteries or galvanic elements, of which I will describe more particularly two, which have given me the most satisfactory results. In the annexed drawings—

Figure 1 shows a vertical section, taken over the line $x\ y$ of fig. 2, of a single cell or galvanic element constructed according to my improved principle.

Figure 2 shows a top view of the element, with the layer $b$ of cement removed in order better to show the internal arrangement of the element.

In both figures the same letters refer to corresponding parts.

It will be understood that any suitable number of these cells or elements may be connected together in the well-known manner to form a galvanic battery.

A is the outer vessel, of porcelain, glass, stone, or earthenware, gutta percha, or any other suitable material, in which vessel A is to be put a porous vessel, B, of any suitable porous material as is usually employed for galvanic batteries, such as porous earthenware, plaster of Paris, sail-cloth, bladder, natural or artificial parchment, or others. This porous vessel B is divided into two chambers or cells, $d$ and $d'$, by means of a porous partition-plate, D. In the cell $d$ is put the positive electro-motive metal or body, such, for instance, as an amalgamated or a non-amalgamated plate, F, of zinc, while the other cell, $d'$, contains the negative electro-motive body or metal, such, for instance, as a plate, G, of copper, gas-coke, or other suitable material. After the plates F and G, provided with their connecting tongues $f$ and $g$, have been put into their respective chambers, $d$ and $d'$, these latter are filled with suitable exciting materials or mixtures, in the state of a dry or slightly moistened, more or less, coarse powder or crystals, which are to be in contact with the plates F and G. Thus, for instance, the chamber containing the zinc plate is to be filled with a mixture of about equal parts of flour of sulphur and kitchen salt, (chloride of sodium,) whilst the other chamber receives a mixture of the crystals of sulphate of copper and nitrate of potash. The vessel B, thus arranged, is then put within the outer vessel A, and in the space left open between both is thrown a sufficient quantity of the crystals of sulphate of copper, after which the top of both vessels is hermetically sealed by a layer, $b$, of any suitable water-proof cement, such, for instance, as a melted mixture of shellac and brick-dust, leaving the tongues $f$ and $g$ protruding through the layer $b$, in which latter is also inserted a small funnel, $m$, (for allowing of pouring water or other suitable liquid on the crystals C in the outer vessel,) and a small glass tube, $n$, for allowing the free escape of air or gas evolved in the interior of the element. A small hole, $o$, should also be provided towards the top in the vessel B.

For putting the element into operation, a quantity of water, sufficient for about filling the outer vessel A, is poured in through the funnel $m$, and four or five hours afterwards the element will be ready for work, and will continue so for several consecutive months, if from time to time a small quantity of water be added, for replacing that lost by evaporation.

Figure 3 shows a vertical sectional view, over the line $x'\ y'$ of fig. 4, of a modification of the above-described arrangement.

Figure 4, showing a top view of this modification, with the layer of cement $b$ removed.

In these figs. 3 and 4 the same letters refer to corresponding parts.

In the outer reservoir A is put the porous vessel, consisting of a bottom part, B, resting on three small feet, $b'$, and provided with two vertical circular porous sides or cylindrical porous diaphragms, $B^1$ and $B^2$, between which latter are situated the two electro-motive metals F and G, the latter separated from each other by a porous partition, H, of stout paper or other suitable material. The electro-motive metals or bodies F and G, which I prefer to be zinc and copper, are of a cylindrical shape, in order to offer a large surface to the action of the exciting matters in which each of them is embedded. Thus, for instance, the zinc plate F is embedded in a mixture of flour of sulphur and kitchen salt, and the copper plate G in one of coarsely-pulverized crystals of sulphate of copper and nitrate of potash, whilst the outer vessel A is provided with a suitable quantity of the said crystals of sulphate of copper. As in the arrangement of figs. 1 and 2, to each of the plates F and G is soldered its respective connecting strips $f$ and $g$, which are to protrude beyond the layer $b$ of cement with which the top of the element is to be hermetically sealed, and in which are inserted, the same as has been explained in respect to the figs. 1 and 2, a small funnel, $m$, and an air-tube, $n$, whilst one or more small holes may be provided in the upper part of the porous sides or diaphragms $B^1$ and $B^2$, for allowing the free escape of the air or gas from the interior of the element. For putting this latter into working order, a sufficient quantity of water is poured in by the funnel $m$, so as nearly to fill the outer vessel A, leaving only a small open space free at the top, underneath the layer $b$ of cement.

I would at once remark here that as the crystals or other coarsely-pulverized exciting matters in the porous vessel are to attract by little and little, from the exciting solution contained in the outer vessel, the quantity of liquid required for moistening them, I think it may be useful to add to the said crystals or mixtures of pulverized materials a suitable quantity of glycerine, chloride of calcium, or other substances which have a great attraction for water.

From what has been described above, and particularly from what has been said in the beginning of this specification in respect to the principle on which is based the construction of my improved batteries or galvanic elements, may be inferred that a great many variations or modifications may be made in the arrangement of these elements or batteries without departing from the said principle. Thus, for instance, one or more zinc and one or more copper plates may be inserted in the solution in the open space left between the inner or porous vessel and the outer vessel or reservoir, and these plates be kept separate or not from each other by suitable porous partitions, so as to make the said plates form one or more galvanic pairs or couples, which may be made use of either alone or in combination with the galvanic couple or couples in the inner or porous vessel. This latter might also, by means of suitable porous partitions, be made to contain several galvanic couples instead of one, as has been described in respect to the figs. 1, 2, 3, and 4; or, instead of one porous vessel, several of them may be provided in the outer vessel, each of them containing its own electro-motive metal or body and exciting powder, as described in figs. 1 and 2, or its own galvanic couple, as described in figs. 3 and 4; or, instead of having the said electro-motive metals or bodies and the exciting powders situated in the inner or porous vessel, they might be located in the space between the said inner or porous and the outer vessel, in which case the porous or inner vessel is to contain the liquid exciting material; or the electro-motive metals or bodies might be reduced to the granular state, and mixed with their respective pulverized or crystalline exciting powders. I neither intend to restrict myself to any precise shape or size to be given to my improved galvanic elements, nor to the batteries formed of them, nor to parts thereof, nor to any particular exciting matters or mixture of them, though I prefer the use of a mixture of flour of sulphur and kitchen salt for the zinc pole, and of the crystals of sulphate of copper and nitrate of potash for the copper pole. In case zinc is made use of, the same may be amalgamated with mercury, or a sufficient quantity of bioxide of mercury be added to the exciting matters of the zinc pole.

Having thus described and particularly ascertained the nature of my improvements in galvanic batteries, and the manner in which the same is or may be put into operation, I would declare, in conclusion, that what I consider to be novel and original, and what I therefore claim as my invention in galvanic batteries or galvanic elements, is—

Putting each of the electro-motive metals of each element in direct contact with any suitable exciting matters, or mixtures of them in the dry or slightly moistened and more or less coarsely-pulverized state, which exciting matters or mixtures of them are to act on their respective electro-motive metals or other electro-motive bodies embedded in them, by attracting moisture from any suitable exciting liquid or solution, from which they are kept separate by a suitable porous partition or diaphragm, substantially in the manner and for the purposes described, and illustrated in the annexed drawings.

BOULAY.

Witnesses:
A. G. BRADE,
MANCHE.